United States Patent
Zavesky et al.

(10) Patent No.: US 12,096,059 B2
(45) Date of Patent: Sep. 17, 2024

(54) METHOD AND APPARATUS FOR AUTHENTICATING MEDIA BASED ON TOKENS

(71) Applicant: AT&T Intellectual Property I, L.P., Atlanta, GA (US)

(72) Inventors: Eric Zavesky, Austin, TX (US); Robert Gratz, Lockhart, TX (US); Jason Decuir, Cedar Park, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 828 days.

(21) Appl. No.: 17/191,781

(22) Filed: Mar. 4, 2021

(65) Prior Publication Data
US 2021/0195269 A1    Jun. 24, 2021

Related U.S. Application Data

(62) Division of application No. 16/169,240, filed on Oct. 24, 2018, now Pat. No. 10,972,777.

(51) Int. Cl.
| | |
|---|---|
| H04N 21/258 | (2011.01) |
| G06F 16/27 | (2019.01) |
| G06V 40/16 | (2022.01) |
| H04L 9/06 | (2006.01) |
| H04L 9/40 | (2022.01) |
| H04N 21/441 | (2011.01) |

(52) U.S. Cl.
CPC ....... *H04N 21/25875* (2013.01); *G06F 16/27* (2019.01); *G06V 40/172* (2022.01); *H04L 9/0643* (2013.01); *H04L 63/0807* (2013.01); *H04N 21/441* (2013.01)

(58) Field of Classification Search
CPC ......... H04L 9/32; H04L 9/321; H04L 9/3213; H04L 9/50; H04L 9/0643; H04L 63/08; H04L 63/0807; H04L 2463/101; H04L 2209/60; H04L 2209/603; G06F 16/27; G06F 21/10; G06F 21/16; H04W 12/12; H04W 12/61; H04W 12/63; H04W 12/06; H04W 4/02; H04W 4/025; H04W 4/029; H04N 21/25875; H04N 21/441; G06V 40/172

See application file for complete search history.

(56) References Cited

U.S. PATENT DOCUMENTS

| | | | |
|---|---|---|---|
| 9,009,596 B2 | 4/2015 | Ortiz | |
| 9,060,273 B2 | 6/2015 | Brown et al. | |
| 9,111,181 B2 | 8/2015 | Allen et al. | |
| 9,332,431 B2 | 5/2016 | Reitsma et al. | |
| 9,426,151 B2 | 8/2016 | Richards et al. | |

(Continued)

FOREIGN PATENT DOCUMENTS

GB    1811263.1    *    7/2018

*Primary Examiner* — Jeremy S Duffield
(74) *Attorney, Agent, or Firm* — Guntin & Gust, PLC; Mark Wilinski

(57) ABSTRACT

Aspects of the subject disclosure may include, for example, obtaining a content item, receiving a first token that comprises an identification of a date and a time when a first portion of the content item is obtained, a location where the first portion of the content item is obtained, or a combination thereof, and transmitting the content item and the first token to a database. Other embodiments are disclosed.

20 Claims, 8 Drawing Sheets

(56) References Cited

U.S. PATENT DOCUMENTS

| | | | |
|---|---|---|---|
| 9,621,565 B2 | 4/2017 | Stack et al. | |
| 9,990,504 B1 | 6/2018 | Chapman et al. | |
| 10,009,342 B2 | 6/2018 | Schrempp et al. | |
| 10,361,866 B1* | 7/2019 | McGregor | H04L 9/0637 |
| 2009/0087161 A1 | 4/2009 | Roberts et al. | |
| 2010/0050090 A1* | 2/2010 | Leebow | G06F 3/048 |
| | | | 382/118 |
| 2011/0018998 A1 | 1/2011 | Guzik | |
| 2012/0224826 A1 | 9/2012 | Caudle et al. | |
| 2013/0330055 A1 | 12/2013 | Zimmermann et al. | |
| 2014/0082067 A1* | 3/2014 | Byers | H04L 67/02 |
| | | | 709/204 |
| 2015/0098690 A1 | 4/2015 | Abbate et al. | |
| 2015/0112773 A1 | 4/2015 | Shahraray et al. | |
| 2016/0014176 A1 | 1/2016 | Ariav et al. | |
| 2016/0021687 A1* | 1/2016 | Granbery | H04W 76/11 |
| | | | 455/41.2 |
| 2016/0192009 A1 | 6/2016 | Sugio et al. | |
| 2016/0227406 A1 | 8/2016 | Waller et al. | |
| 2016/0306950 A1 | 10/2016 | Schuman | |
| 2016/0335626 A1* | 11/2016 | Ko | G06Q 20/06 |
| 2017/0155572 A1* | 6/2017 | Ge | G06T 5/50 |
| 2017/0180780 A1 | 6/2017 | Jeffries | |
| 2017/0221059 A1* | 8/2017 | Sethi | G06Q 20/3224 |
| 2017/0287170 A1 | 10/2017 | Perona et al. | |
| 2017/0366558 A1* | 12/2017 | Liu | H04L 63/123 |
| 2017/0373859 A1* | 12/2017 | Shors | H04L 9/3247 |
| 2018/0026790 A1 | 1/2018 | Seo et al. | |
| 2018/0084424 A1 | 3/2018 | Sonasath et al. | |
| 2018/0114063 A1 | 4/2018 | Wexler et al. | |
| 2018/0121635 A1 | 5/2018 | Tormasov et al. | |
| 2018/0160194 A1 | 6/2018 | Bayliss et al. | |
| 2018/0176017 A1 | 6/2018 | Rodriguez et al. | |
| 2018/0184138 A1 | 6/2018 | Shaw et al. | |
| 2018/0234234 A1 | 8/2018 | Hurley et al. | |
| 2019/0199689 A1 | 6/2019 | Mckellar et al. | |
| 2019/0347438 A1* | 11/2019 | Hamlin | G06F 21/6218 |
| 2019/0354694 A1 | 11/2019 | Azoulay | |
| 2020/0034888 A1* | 1/2020 | Soundararajan | H04L 63/126 |
| 2020/0137440 A1 | 4/2020 | Zavesky et al. | |
| 2021/0294920 A1* | 9/2021 | Sachs | G06F 21/60 |
| 2021/0329310 A1* | 10/2021 | Wilson | H04N 21/252 |

\* cited by examiner

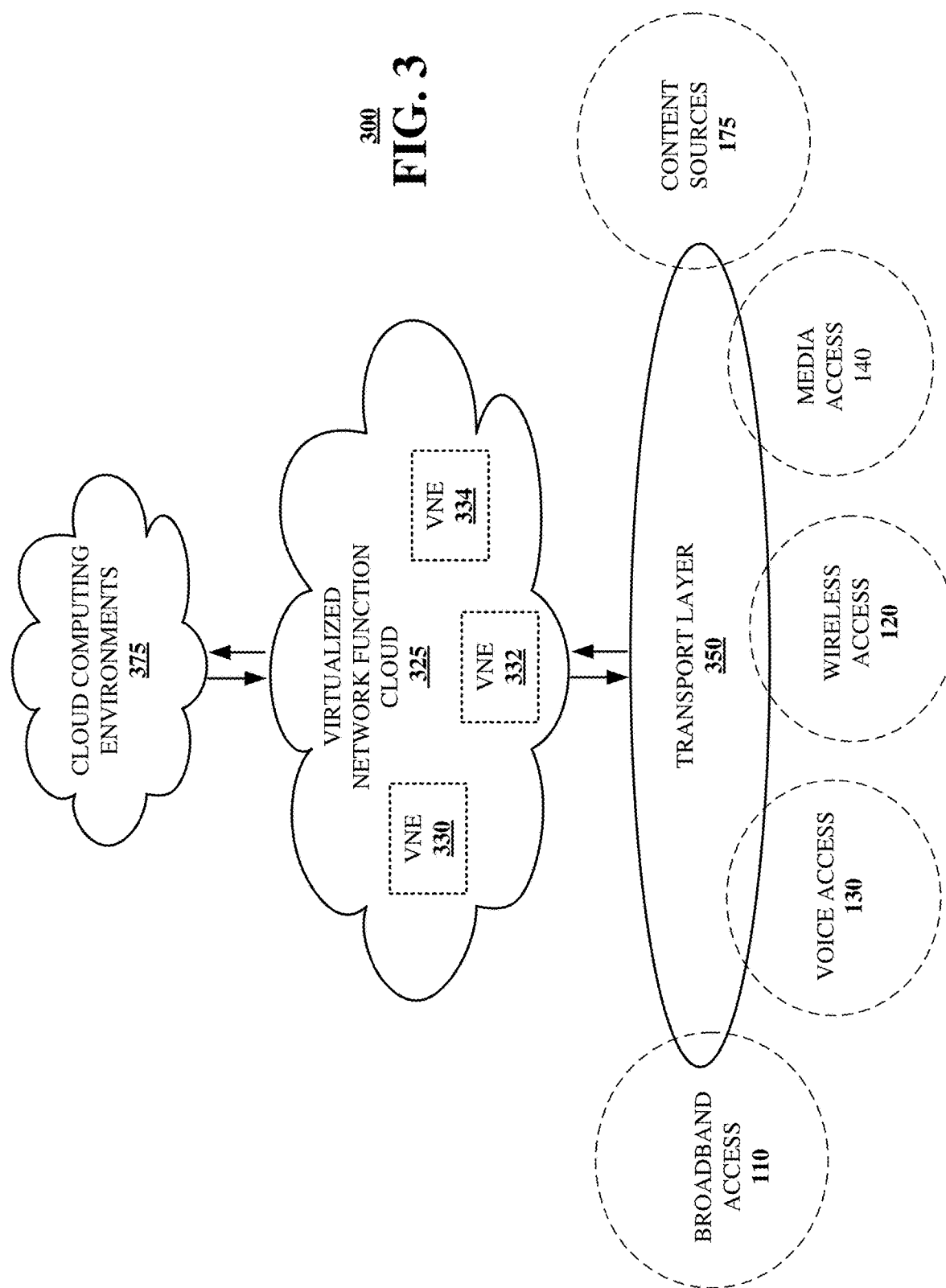

METHOD AND APPARATUS FOR AUTHENTICATING MEDIA BASED ON TOKENS

CROSS-REFERENCE TO RELATED APPLICATIONS

This application is a divisional of U.S. patent application Ser. No. 16/169,240, filed Oct. 24, 2018. All sections of the aforementioned application are incorporated herein by reference in their entirety.

FIELD OF THE DISCLOSURE

The subject disclosure relates to a method and apparatus for authenticating media based on tokens.

BACKGROUND

Given the proliferation/availability of user devices (e.g., mobile devices), content is being generated at increasing rates. In some instances, it is desirable to authenticate such content in terms of, e.g., the originator of the content, a location where the content was created/captured, a date and/or time the location was created/captured, etc. Using conventional techniques, providing for such authentication requires coordination of legal requirements/permissions (e.g., authorization in view of privacy considerations) and service/operator engineering specifications (e.g., provisions for information retrieval), making the authentication of content difficult.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for authenticating/validating content. In some embodiments, content may be authenticated on the basis of one or more tokens. Other embodiments are described in the subject disclosure.

One or more aspects of the subject disclosure include a generation and distribution (e.g., transmission and reception) of one or more tokens. The tokens may be generated by reliable/trustworthy sources, such as for example a device or component of a network. The tokens may be queried subsequent to their distribution for authentication purposes.

One or more aspects of the subject disclosure include a hashing of one or more tokens. Such hashing may provide for anonymity/privacy and may frustrate/complicate attempts by third parties in terms of spoofing the tokens.

One or more aspects of the subject disclosure include a scoring service that can be used to filter, corroborate, and/or validate content. The scoring service may be facilitated without loss of user privacy. In some embodiments, the scoring service might not implicate legal obligations.

Figure 1:
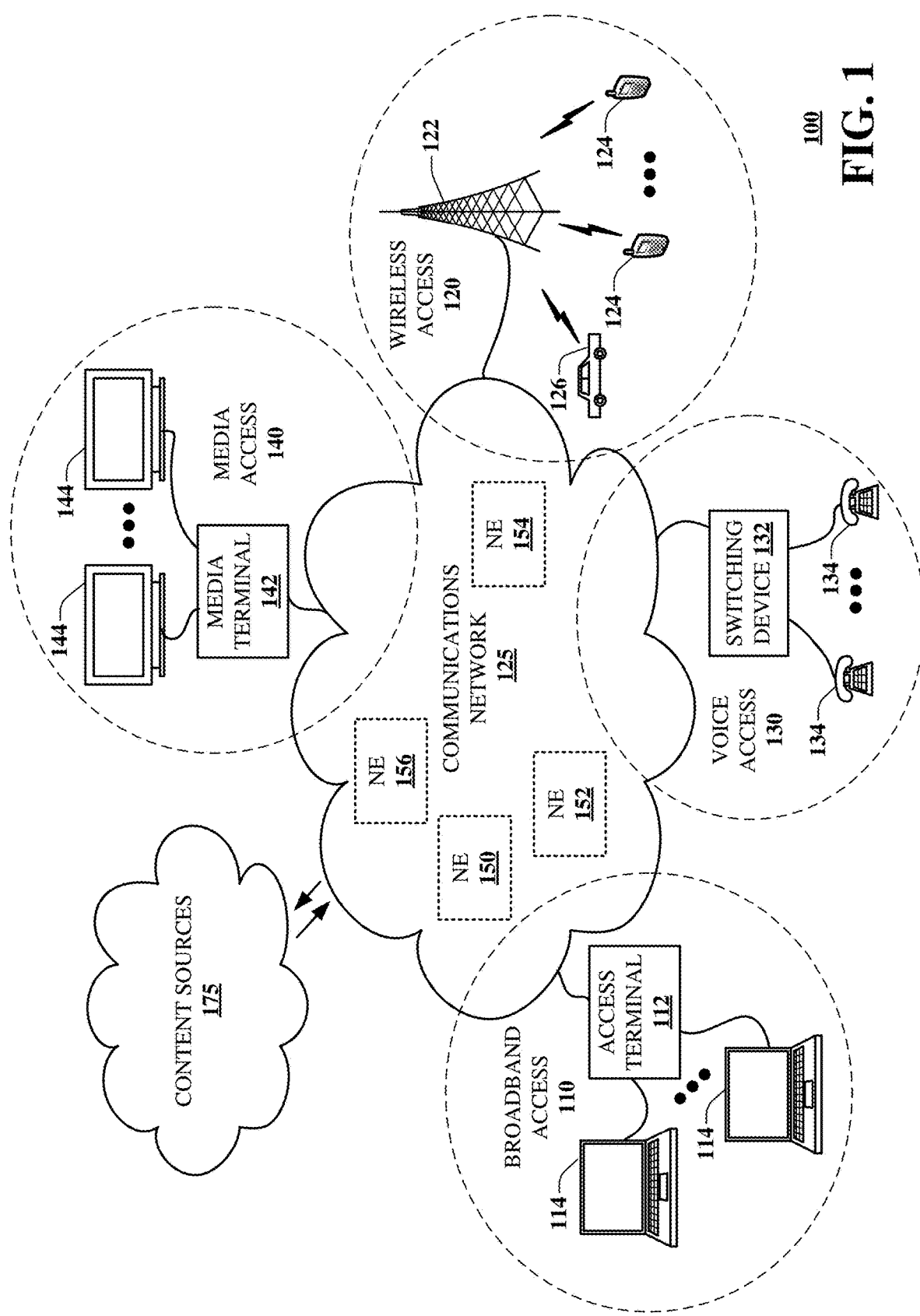
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part transmitting a first token that includes an identification of a date and a time when the first token is transmitted and a location from where the first token is transmitted, storing a copy of the first token in a database, receiving a content item and a second token from a user device, and applying a score to the content item based on a comparison of the copy of the first token and the second token. Communications network 100 can facilitate in whole or in part recording a content item, receiving a first token that includes an identification of a date and a time when a first portion of the content item is recorded and a location where the first portion of the content item is recorded, and transmitting the content item and the first token to a database. Communications network 100 can facilitate in whole or in part obtaining a content item, receiving a first token that includes an identification of a date and a time when a first portion of the content item is obtain, a location where the first portion of the content item is obtained, or a combination thereof, and transmitting the content item and the first token to a database.

A communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
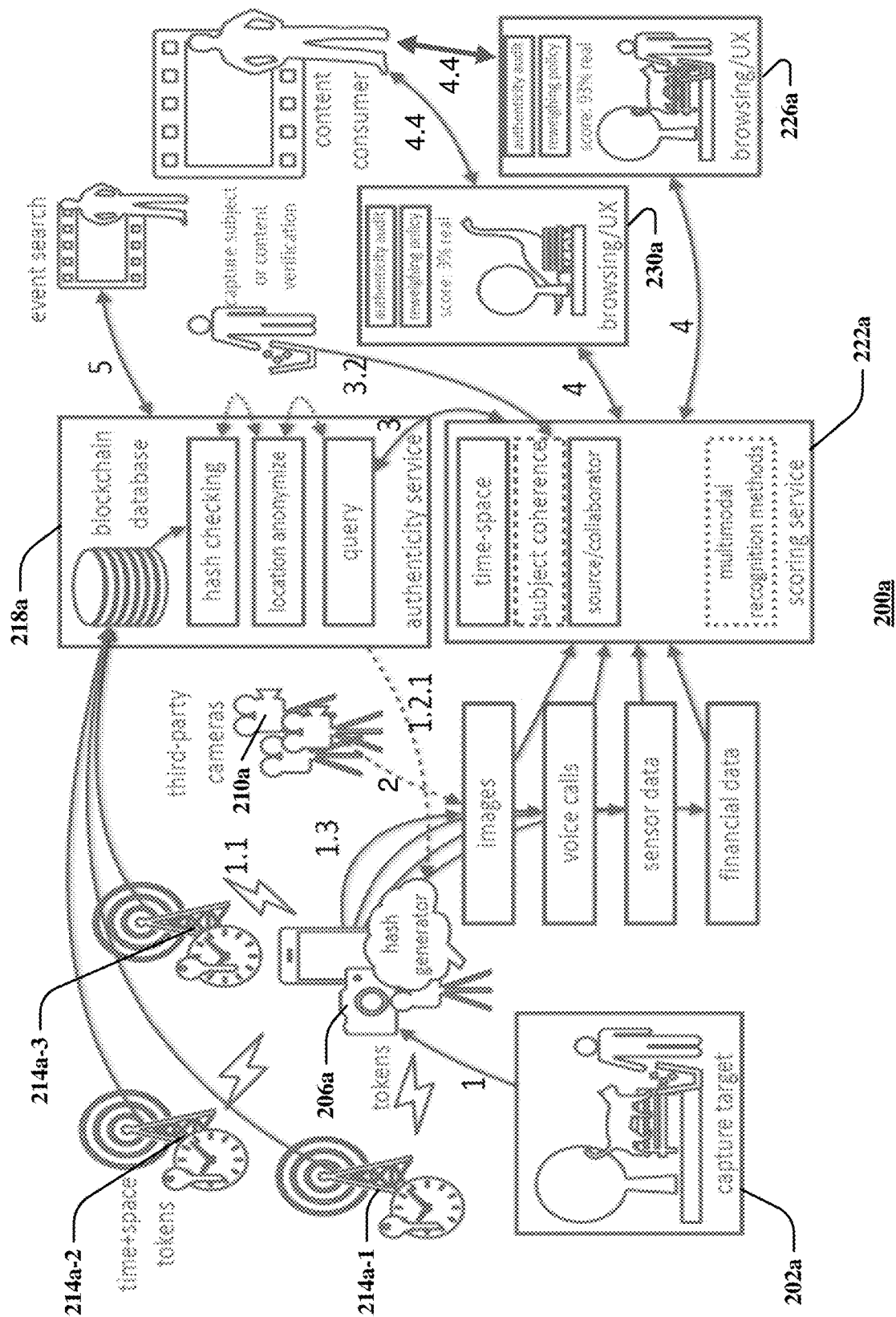
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within the communication network of FIG. 1 in accordance with various aspects described herein. As reflected by the arrows 1 and 2 in FIG. 2A, a target/scene 202a incorporating a person and a cat at a park may be captured via one or more devices, such as for example a user device 206a (arrow 1) and/or one or more third-party devices 210a (arrow 2). The devices 206a and 210a, which may include for example a mobile device (e.g., a mobile phone), may include one or more cameras, microphones, etc. As reflected by FIG. 2A, content that is captured and subjected to authentication techniques in conjunction with this disclosure may take one or more forms, such as for example images/video, audio (e.g., voice calls, music, etc.), data (e.g., sensor data, financial data, etc.), etc.

As represented via reference character 1.1 in FIG. 2A, one or more components/devices of a network, such as for example base stations/towers 214a-1, 214a-2, and/or 214a-3 may generate and transmit one or more tokens. The tokens may include a date stamp and/or time stamp (or other date/time-based indicators) and/or a location/space indicator. The location indicator may correspond to a location of the respective base station that transmits a given token, a location of a respective user device/camera, or a location of some other device (e.g., a router, a switch, a media processor, etc.).

In some embodiments, a device (e.g., a camera) that captures the scene 202a may receive a (raw) token from a base station (e.g., the base station 214a-1) and append the token to the content associated with the scene 202a. In some embodiments, the token may be appended to the content as a watermark, as metadata, or a combination thereof.

In some embodiments, a device may apply a hash to the received token(s) resulting in a hashed token. The hashed token may be appended to the content, potentially in lieu of appending the (raw) token to the content. The use of a hashed token (generated from one or more of the raw tokens transmitted by the base stations) may provide for an additional layer of security/authentication by making it more difficult to subsequently create/generate second content and asserting that the second content was captured at a location and date/time coincident with the (content of the) scene 202a.

In some embodiments, the tokens transmitted by one or more of the base stations 214a-1 through 214a-3 may be stored by an authentication/authenticity service 218a. In some embodiments, the authentication service 218a may include a database, a library, etc., to facilitate a storage of the tokens. The tokens may be stored in accordance with a distributed ledger that comprises a plurality of devices. The distributed ledger may adhere to, or incorporate, blockchain technology. More generally, aspects of the authentication service 218a may be implemented in conjunction with a publicly available, decentralized token service for content authenticity. While shown separately, in some embodiments the authentication service 218a may be incorporated as part of one or more of the base stations 214a-1 through 214a-3.

In some embodiments, and as reflected by the arrow 1.2.1, the authentication service 218a may transmit the tokens that the authentication service 218a receives to the user device 206a and/or the third party devices 210a. The authentication service 218a may subject the tokens that it transmits as part of the arrow 1.2.1 to a hashing function and/or an encryption function (potentially based on one or more keys). The user device 206a and/or the third party devices 210a may append the content that they generate/capture with the (hashed and/or encrypted) tokens that are received from the authentication service 218a. The devices 206a and 210a incorporating the tokens into the content by way of the authentication service 218a (as represented by the arrow 1.2.1) may enhance authenticity by being able to leverage a relationship of trust between the authentication service 218a and the devices 206a and 210a.

In some embodiments, and as illustratively represented via the arrow 1.3, the content as captured (with any appended (raw, hashed, and/or encrypted) tokens) may be provided to a content-sharing/scoring service 222a. In some embodiments, the scoring service 222a may be incorporated as part of one or more of the devices 206a and 210a, the base stations 214a-1 through 214a-3, the authentication service 218a, etc.

As represented by the arrow 3 in FIG. 2A, a comparison may be performed between the tokens that were appended to the content and the tokens stored at the authentication service 218a. That comparison may generate a score that is representative of the similarity (or, analogously, the difference) between the appended tokens and the tokens stored at the authentication service 218a in terms of date, time, and/or location. For example, if the appended tokens and the tokens stored at the authentication service 218a are similar, that may serve as a first indicator that the content that is submitted is authentic. Conversely, if the appended tokens and the tokens stored at the authentication service 218a are dissimilar (e.g., differ from one another in an amount that is greater than a threshold) that may serve as a first indicator that the submitted content is inauthentic.

The first indicator may be subjected to normalization or modulation to facilitate comparison in one or more dimensions or across various sets of content. For example, reliability may be gauged/assessed against historical sets of content, potentially on the basis of a user or associated device having been authenticated as having been trustworthy in the past.

As represented by the arrow 3.2, a person/user captured as part of the scene 202a may verify that the captured content is authentic. For example, if the person has an account with, e.g., the authentication service 218a or the scoring service 222a, the person may receive a request (e.g., an email, a text message, etc.) to confirm that the scene 202a (or the captured content associated therewith) is valid/authentic. Such a request may be submitted/transmitted to the person (or the person's user device) on the basis of a tag (e.g., metadata, a hashtag) that is applied/appended to the content that identifies the person, on the basis of object (e.g., facial/face) recognition techniques, etc. Still further, one or more techniques may be applied on the basis of a computed content fingerprint to identify objects, people, scenes, locations, events (e.g., a press conference), landmarks (e.g., art, buildings, etc.), etc. The person's confirmation may take the form of a hashed token that may match the token that was appended to the content; conversely, the lack of a match may indicate that the person was not in fact present/included in the content/scene. The person's confirmation/denial regarding the request may serve as a second indicator as to whether the submitted content is authentic or inauthentic.

In conjunction with the scoring service 222a, content submitted by the user device 206a may be compared with content submitted by the third-party devices 210a. For example, image and/or audio processing techniques may be applied to detect if first content submitted by the user device 206a is substantially similar to additional content submitted by the third-party devices 210a (where the additional content has already been authenticated/verified in accordance with the techniques described herein). If the first content is substantially similar to the additional content (e.g., is similar in an amount greater than a threshold) that may serve as a third indicator that the first content is authentic. Conversely, if the first content differs from the additional content in an amount greater than the threshold, that may serve as a third indicator that the first content is inauthentic.

In addition to the three forms of scoring indication described above, in some embodiments the scoring service 222a may implement multimodal recognition techniques. In some embodiments, such multimodal recognition techniques may incorporate statistical analyses, human-machine interactions, machine learning, artificial intelligence, and/or other factors/considerations.

The authentication service 218a and/or the scoring service 222a may be executed in conjunction with (e.g., on or by) one or more user devices, one or more network elements (e.g. a router, a switch, a modem, a media processor), network infrastructure (e.g., a server, a controller, a base station, etc.), or a combination thereof.

In some embodiments, one or more scores generated/calculated by the scoring service 222a may be presented to/by one or more users/user devices as represented by the arrows 4 in FIG. 2A. For example, a first browser (or other presentation mechanism) 226a may reflect a scene that has a score of 93% real relative to the scene 202a, whereas a second browser (or other presentation mechanism) 230a may reflect a scene that has a score of 3% real relative to the scene. Whereas the first browser 226a accurately depicts the cat shown in the scene 202a, the second browser 230a replaces the cat with a (fictional) dinosaur; this replacement of the cat with the dinosaur may be a significant contributing factor in the low score associated with the second browser 230a.

A first consumer of content might not be interested in viewing content that falls below a particular score threshold, whereas a second consumer of content may be interested in inauthentic or fictional content. Accordingly, and as reflected by the arrows 4.4 in FIG. 2A, in some embodiments users/content consumers may establish one or more thresholds such that associated devices can filter content across one or more of the scores (or, analogously, an aggregate score (e.g., an average) representative of some or all of the individual scores).

In some embodiments, filtration that is provided may be automated such that a user/user device might not need to concern herself/itself with the details associated with the filtration. Alternatively, in some embodiments a user/user device may be presented with an authentication audit/audit log to allow the user/user device to (manually) determine how the score(s) were generated. In this respect, greater control/flexibility over the filtration may be provided to the user/user device. For example, a content consumer may be more flexible in terms of potentially inaccuracy in a first dimension (e.g., location) relative to other dimensions (e.g., date, time, or captured subject matter).

In some embodiments, various policies may be established/used to filter across scores based on share/exposure. For example, a score that falls below a given threshold may disqualify the content from being included as part of, e.g., a marketing campaign. In some embodiments, a score may be used to determine whether a particular audience member (or set of audience members) may obtain access to a given piece of content. For example, a score can be used to assess whether a piece of content is appropriate for children below a particular age.

In some embodiments, content consumers may influence/provide a score associated with a particular content item. For example, if on a given date and time a content consumer's device is determined to have been present at the same, or substantially similar, location as the scene 202a, the content consumer/content consumer's device may be given an ability to authenticate what is depicted in the associated content. More generally, content consumers may rate content (e.g., based on score or scale, based on expressed approval (e.g., thumbs up)/disapproval (e.g., thumbs down), etc.), which may serve as a factor in a content item's overall score/rating. In this respect, aspects of the disclosure may leverage the so-called "wisdom of the crowds" to filter-out suspicious/inauthentic content relative to more reliable/authentic content.

As shown via the arrow 5 in FIG. 2A, in some embodiments a user or content consumer may search for a particular content item. The search may pertain to the particular content item itself. For example, the search may include keywords associated with the location, the date, the time, the subject matter, or a combination thereof, of the content item. In some embodiments, the search may include a specification of tokens and/or hashes that can be used for faster, irrefutable searches and indexing by date, time, and/or location. The search may be facilitated at least in part via a search engine.

Figure 2B:
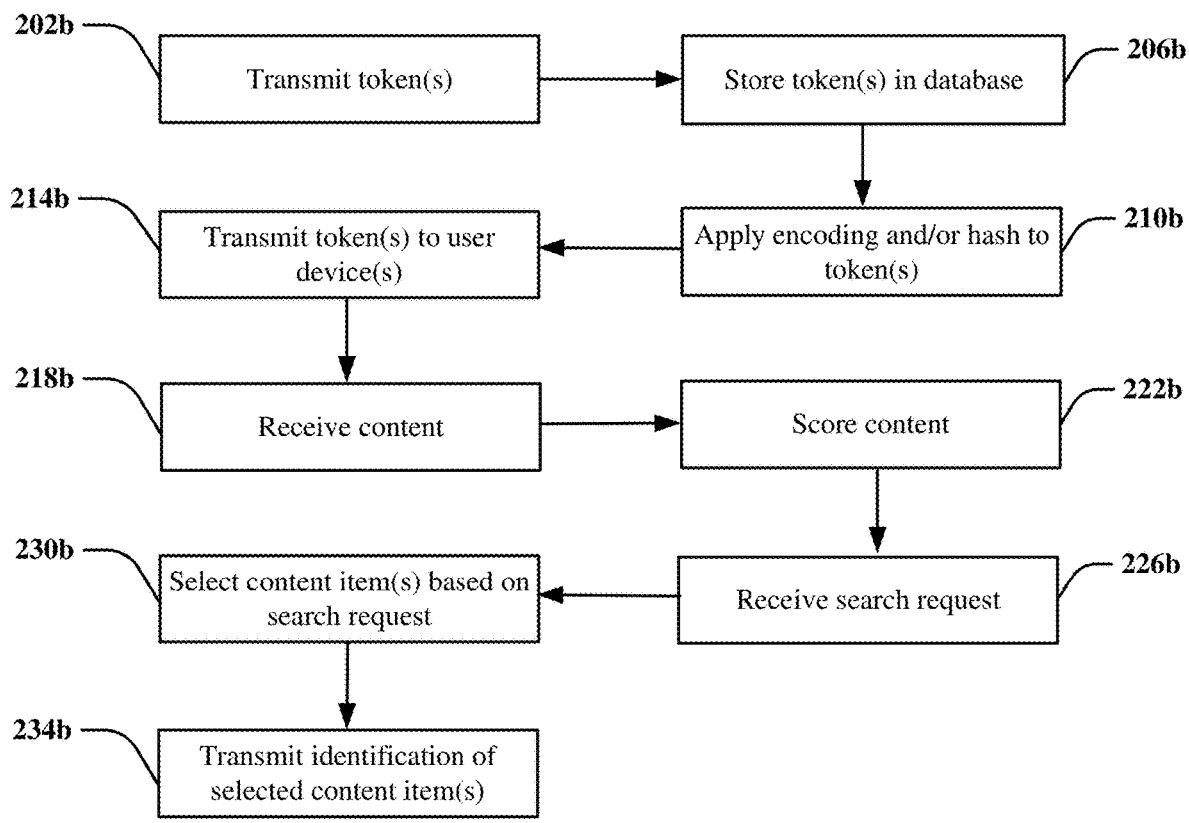
FIG. 2B depicts an illustrative embodiment of a method in accordance with various aspects described herein.

FIG. 2B depicts an illustrative embodiment of a method 200b in accordance with various aspects described herein. The method 200b may be executed in conjunction with one or more devices or components, such as for example one or more of the devices or components described herein. For the sake of ease in description/illustrative convenience, the method 200b is described in conjunction with the system 200a of FIG. 2A. One skilled in the art will appreciate, based on a review of this disclosure, that the method 200b may be adapted to accommodate other systems, platforms, and environments.

In block 202b, one or more tokens may be transmitted. For example, in some embodiments a base station/tower (e.g., base station/tower 214a-1 of the system 200a of FIG. 2A) may transmit tokens periodically. The transmitted tokens may include information, such as for example date information, time information, location information, or a combination thereof.

In block 206b, copies of the tokens that are transmitted in block 202b may be stored in a database (e.g., database 218a of FIG. 2A). The database may be operative in accordance with a distributed ledger (e.g., blockchain), such that it may be difficult to generate inauthentic/false/spoofed tokens in the database.

In block 210b, encoding and/or hashing may be applied to the tokens stored in the database. Such encoding and/or hashing may be specific to a particular user device (e.g., user device 206a of FIG. 2A) or a subset of user devices (e.g., devices associated with a subscription account with a service provider). The encoding and/or hashing provided in block 210b may be operative in accordance with a relationship of trust that may be established between the database and the user device.

In block 214b, the tokens (e.g., the encoded and/or hashed tokens of block 210b) may be transmitted from the database to one or more user devices. The transmission of the tokens in block 214b may facilitate the user device(s) appending the tokens to content that is generated or obtained by the user device(s).

In block 218b, the database may receive content from a user device. For example, the content may be received in conjunction with a request to share or distribute the content. The request may be provided in relation to one or more social media platforms, applications, websites, etc. The received content may include one or more tokens (e.g., hashed tokens) appended thereto.

In block 222b, the content received as part of block 218b may be scored. The scoring applied to the content may be based on a comparison of tokens that may be appended to the received content (e.g., block 218b) relative to the tokens that are stored in the database (e.g., block 206b). The scoring of block 222b may be based on subject coherence (e.g., confirmation or denial of the accuracy of the content by a person/user captured in the content, potentially based on a token submitted by the person/user), collaboration from other sources/users/user devices, etc. The score(s) calculated as part of block 222b may represent a level of authenticity associated with the content. The score(s) may be calculated in accordance with one or more scoring scales.

In some embodiments, block 222b may include acceptance or rejection (e.g., a discarding) of the content received in block 218b based on a comparison of one or more of the scores that are generated relative to one or more thresholds. In such embodiments, the storage of the content in the database may be conditioned on acceptance of the content. In some embodiments, the content may be stored in the database as part of block 222b, potentially with the score(s) calculated in block 222b applied thereto.

In block 226b, a search request may be received by the database. The search request may have been generated by a user device. The search request may include keywords associated with/related to the subject matter of content stored in the database. The search request may be based on a specification that the score of any content that is selected as a search result be greater than a threshold. The search request may include one or more tokens.

In block 230b, the database may select one or more content items based on the search request of block 226b. For example, the database may select the content based on: one or more of the parameters specified as part of search request, user/user device preferences/capabilities/restrictions, a current or future/scheduled location of the user device submitting the request, etc.

In block 234b, an identification of the content items selected in block 230b may be transmitted to the user device that submitted the search request in block 226b. For example, an identification of a given content item may include a selectable link that, when selected by the user device, causes the database to transmit the given content item to the user device. Alternatively, the identification of the content items in block 234b may include at least a portion of the content items themselves (e.g., a trailer/preview of the content items, a first portion/segment of the content items, etc.).

Figure 2C:
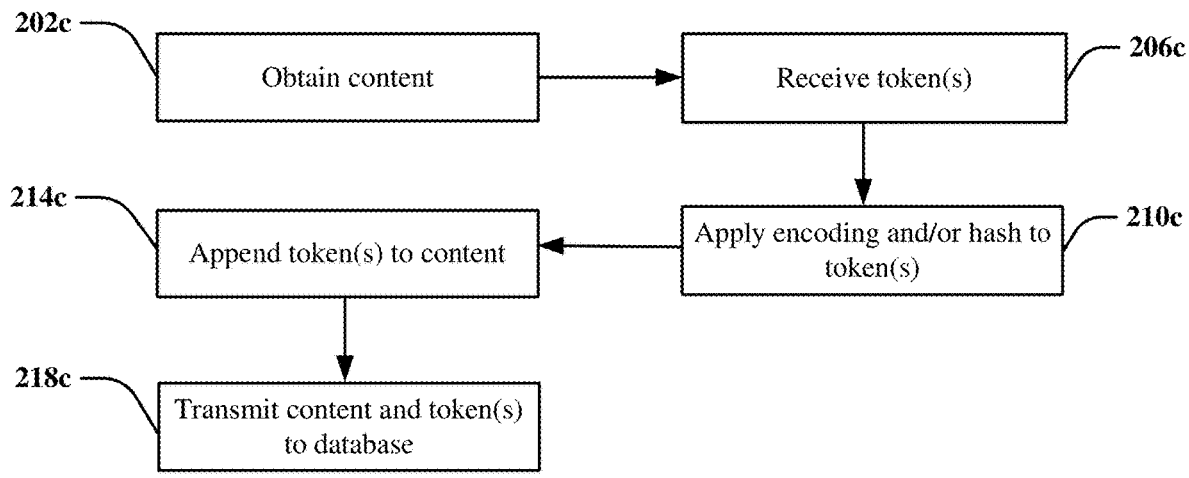
FIG. 2C depicts an illustrative embodiment of a method in accordance with various aspects described herein.

FIG. 2C depicts an illustrative embodiment of a method 200c in accordance with various aspects described herein. The method 200c may be executed in conjunction with one or more devices or components, such as for example one or more of the devices or components described herein. For the sake of ease in description/illustrative convenience, the method 200c is described in conjunction with the system 200a of FIG. 2A. One skilled in the art will appreciate, based on a review of this disclosure, that the method 200c may be adapted to accommodate other systems, platforms, and environments.

In block 202c, content may be obtained by a user device (e.g., user device 206a of FIG. 2A). For example, the content may be obtained by the user device based on a recording of the content (or an associated scene—e.g., scene 202a of FIG. 2A) by the user device. Thus, the content may correspond to original content captured by the user device.

In some embodiments, the content obtained by the user device in block 202c may be based on/include content received from another device (e.g., another user device). In this respect, the content obtained in block 202c may include non-original/second-hand content that was captured/recorded by, e.g., the another device. The content may include, or have associated therewith, an identification (e.g., an address, a phone number, etc.) of the another device that provided the content to the user device. In this manner, a log may be established to track the distribution/dissemination of the content from a first device (e.g., the another device) to a second device (e.g., the user device). The log may also include an identification of edits that may have been made to the content by the first/another device or the second/user device.

In block 206c, the user device may receive one or more tokens. For example, one or more of the tokens may be received from a base station/tower (e.g., base station/tower 214a-1 of FIG. 2A). In some embodiments, one or more of the tokens may be received from a database (e.g., database 218a of FIG. 2A). One or more of the tokens received in block 206c may have encryption and/or hashing applied to it.

In block 210c, the user device may apply an encoding and/or hashing to one or more of the tokens received in block 206c.

In block 214c, the tokens (e.g., raw tokens, encoded tokens, hashed tokens, or a combination thereof) may be appended to the content obtained in block 202c.

In block 218c, the content (with any tokens that may have been appended in block 214c) may be transmitted to a database (e.g., database 218a of FIG. 2A) for potential scoring, acceptance, or rejection of the content by the database. The content and the token(s) may be transmitted as part of a message.

While block 214c is shown as a separate block from block 218c, in some embodiments block 214c may be merged with block 218c. For example, the user device might not specifically append the tokens to the content as shown in block 214c of FIG. 2C, but instead, may simply transmit the content and the tokens to the database. Illustration of block 214c in FIG. 2C is based on a recognition/understanding that tokens may be received by the user device at different points in time. For example, a first token may be received at a first time instance and a second token may be received at a second time instance that is subsequent to the first time instance. In this respect, in block 214c the first token may be applied to a first portion of the content obtained in block 202c and in block 214c the second token may be applied to a second portion of the content obtained at the second time instance in block 202c. Stated slightly differently, block 214c may be executed to tag/flag different portions of the content as the content is obtained, as the user device changes location, etc.

While for purposes of simplicity of explanation, the respective processes are shown and described as a series of blocks in FIGS. 2B-2C, it is to be understood and appreciated that the claimed subject matter is not limited to the order of the blocks, as some blocks may occur in different orders and/or concurrently with other blocks from what is depicted and described herein. Moreover, not all illustrated blocks may be required to implement the methods described herein. In some embodiments, an aspect of a first method (e.g., the method 200b) may be combined with one or more aspects of a second method (e.g., the method 200c).

Aspects of the disclosure may reduce (e.g., minimize) burdens on network/service providers/operators by offloading authentication tokens to public locations with explicit location and date/time stamps/tags. A user's/device's presence at or proximate a transmission source of the tokens can be anonymously checked/verified without provider/operator intervention at a subsequent point in time.

Aspects of the disclosure may be used to incorporate tokens in conjunction with various assets (e.g., digital content). For example, tokens may be appended to images, movies, log-ins/check-ins, social media comments, community content, speeches, transcripts, etc. Authentication of the tokens may ensure that the content is legitimate or originates from a trustworthy source. In this respect, aspects of the disclosure may help to ensure that rights-holders (e.g., intellectual property rights holders) are fairly compensated by helping to detect unlawful or otherwise inappropriate disseminations of goods or services.

Aspects of the disclosure may be used to create and manage a scoring mechanism/service that may be intuitively presented to a user/consumer. Various scores may be influenced/based on location, time, collaboration, degree/level of historical authenticity, or a combination thereof. In some embodiments, links may be provided to historical events through, e.g., a public auditing service, such that additional verification/authentication regarding content may be obtained.

In some embodiments, a scoring mechanism/service may be used in automated applications. For example, such scoring may be obtained and/or presented as an absolute number, in conjunction with one or more inputs, etc. The scoring that is obtained/provided may be used for a multitude of purposes, such as for example a filtering of content, verification of bot-approved actions, etc.

Aspects of the disclosure may be used to provide a low-cost mechanism for long-term token storage. In this respect, aspects of the disclosure can be used to tie content to particular locations, dates, and times, where that content may be retrieved at a distant point in time (e.g., decades later). In an illustrative use-case scenario, aspects of the disclosure can be used as part of cracking "a cold case" in connection with law enforcement, where content that is initially deemed to have little relevance may subsequently gain significant relevance upon the discovery of new/additional evidence some years later. More generally, aspects of the disclosure may be used to prove/disprove that a person was/was not at a particular location on a particular date/time, that a particular event occurred/did not occur at the location on the date/time, etc.

Aspects of the disclosure may provide an ability to share tokens (e.g., hashed authentication tokens) to proximal devices to facilitate tagging/stamping insights or metadata. For example, tokens received by a first device may be (re-)transmitted by the first device to one or more other devices. In this respect, aspects of the disclosure may be applied in connection with Internet of Things (IoT)-based devices. In some embodiments, tokens may be shared among devices via, e.g., WiFi, radio frequency (RF) or near-field communications (NFC), cellular communications, etc. More generally, any combination of wired or wireless communications may be used to share tokens. In some embodiments, tokens may be distributed/disseminated in accordance with a guided electromagnetic wave. Such an electromagnetic wave may be transmitted and/or received as a surface wave in some embodiments.

As described above, aspects of the disclosure may be used to filter content. Such content may include phone calls, emails, etc. In some embodiments, a filter may check a header of the content for particular tokens. If the necessary tokens are absent, the filter may reject the content or flag/tag the content as being suspicious. In this manner, robotic calls (also known as robo calls), spam, etc., may be rejected or flagged/tagged as appropriate. Aspects of such filtration may also be used to reject and/or flag/tag so-called "fake news" that originates from an unreliable source. Still further, aspects of the disclosure may be used for emergency verification, such as for example determining circumstances concerning a sick or unconscious person that is unable to communicate.

Aspects of the disclosure may be used to authorize another user/person, a machine/robot, etc., to perform a task or function on one's behalf as part of, e.g., a work request. For example, the another user/person/machine/robot may present a token that matches an original token included in the work request. In this respect, aspects of the disclosure may be used to authenticate a relationship between two or more users or entities, such as for example a master-slave or agency-based relationship.

Aspects of the disclosure may incorporate a community-based approach, whereby a group vote may be required to release or annotate content for purposes of, e.g., privacy, approved access rights, etc. In some embodiments, a first person's/user's vote (e.g., a head of a household) may carry more weight relative to a second person's/user's vote (e.g., a child or dependent of the household). The group vote may be taken while the content is being recorded/captured, or prior or subsequent thereto.

Aspects of the disclosure may provide for enhanced protection against spoofing a time, a date, a location, or a combination thereof, in respect of content/assets. For example, public, permanent tokens from any number of available service providers may help to safeguard against such spoofing. In some embodiments, the service providers (or the tokens they provide) may in turn be scored for purposes of authenticity. In this respect, aspects of the disclosure may be applied in connection with a supply-chain whereby precise location determinations/authentications may be obtained.

Aspects of the disclosure may be used to continuously and/or periodically update scores associated with content. For example, as more information becomes available, the authenticity of a given content item may be updated accordingly.

Aspects of the disclosure may be applied in various scenarios. For example, aspects of the disclosure may be used to suppress/censor false/inauthentic content, promote legitimate/authentic content, etc. In this respect, aspects of the disclosure may be used in connection with news reporting, educational environments (e.g., distance-learning), trial/legal proceedings, etc.

Aspects of the disclosure may be used in the creation of panoramic content, such as for example 360-degree videos. For example, multiple video and/or still-image cameras may be used to capture/record footage (e.g., live content) from various viewpoints/angles and the footage provided from each camera may be stitched/pieced together to create a single video and/or image file. The tokens associated with the captured footage may be examined to select the appropriate cameras for compiling the file.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, and the methods 200b and 200c presented in FIGS. 1 and 2A-2C. For example, virtualized communication network 300 can facilitate in whole or in part transmitting a first token that includes an identification of a date and a time when the first token is transmitted and a location from where the first token is transmitted, storing a copy of the first token in a database, receiving a content item and a second token from a user device, and applying a score to the content item based on a comparison of the copy of the first token and the second token. Virtualized communication network 300 can facilitate in whole or in part recording a content item, receiving a first token that includes an identification of a date and a time when a first portion of the content item is recorded and a location where the first portion of the content item is recorded, and transmitting the content item and the first token to a database. Virtualized communication network 300 can facilitate in whole or in part obtaining a content item, receiving a first token that includes an identification of a date and a time when a first portion of the content item is obtain, a location where the first portion of the content item is obtained, or a combination thereof, and transmitting the content item and the first token to a database.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
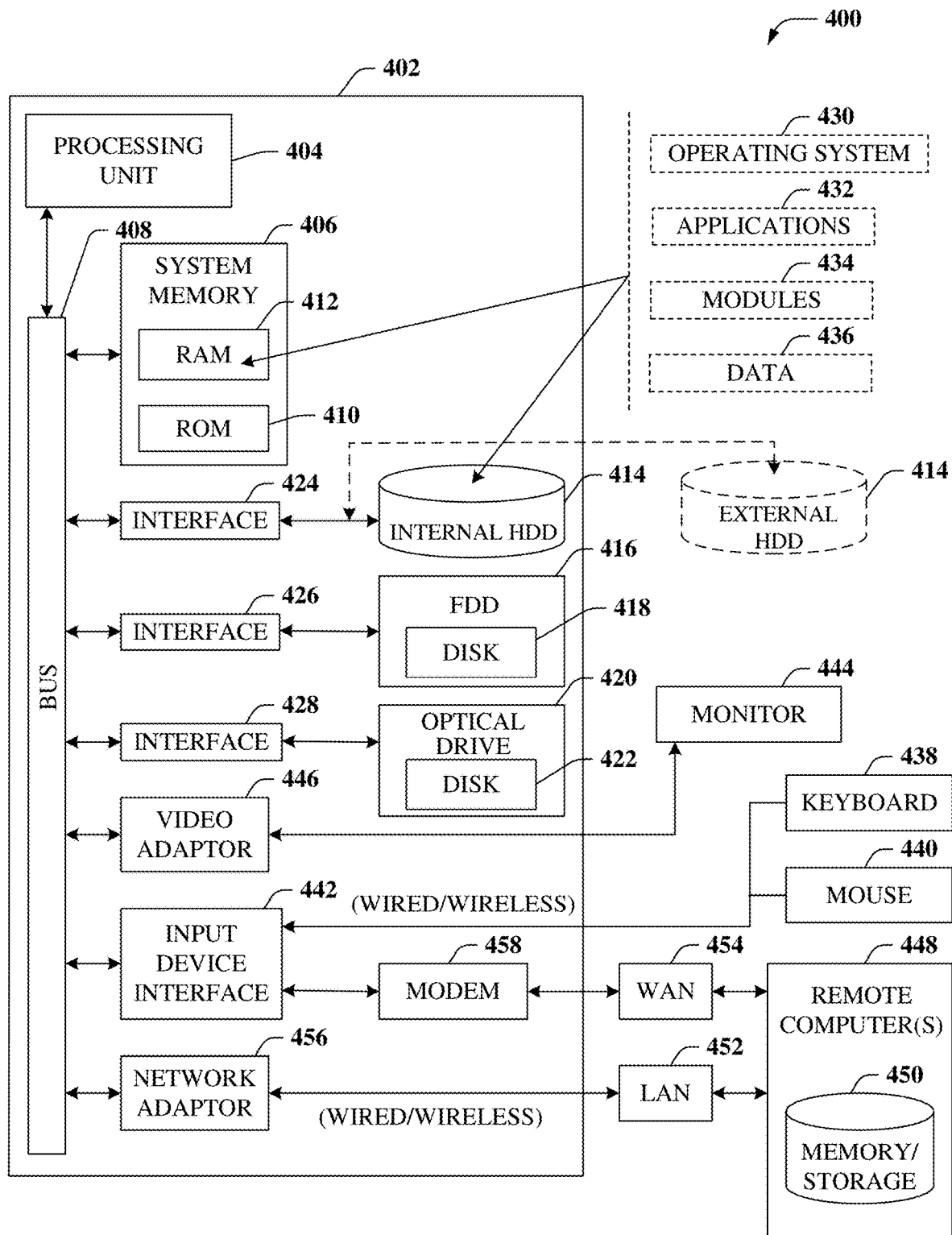
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part transmitting a first token that includes an identification of a date and a time when the first token is transmitted and a location from where the first token is transmitted, storing a copy of the first token in a database, receiving a content item and a second token from a user device, and applying a score to the content item based on a comparison of the copy of the first token and the second token. Computing environment 400 can facilitate in whole or in part recording a content item, receiving a first token that includes an identification of a date and a time when a first portion of the content item is recorded and a location where the first portion of the content item is recorded, and transmitting the content item and the first token to a database. Computing environment 400 can facilitate in whole or in part obtaining a content item, receiving a first token that includes an identification of a date and a time when a first portion of the content item is obtain, a location where the first portion of the content item is obtained, or a combination thereof, and transmitting the content item and the first token to a database.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
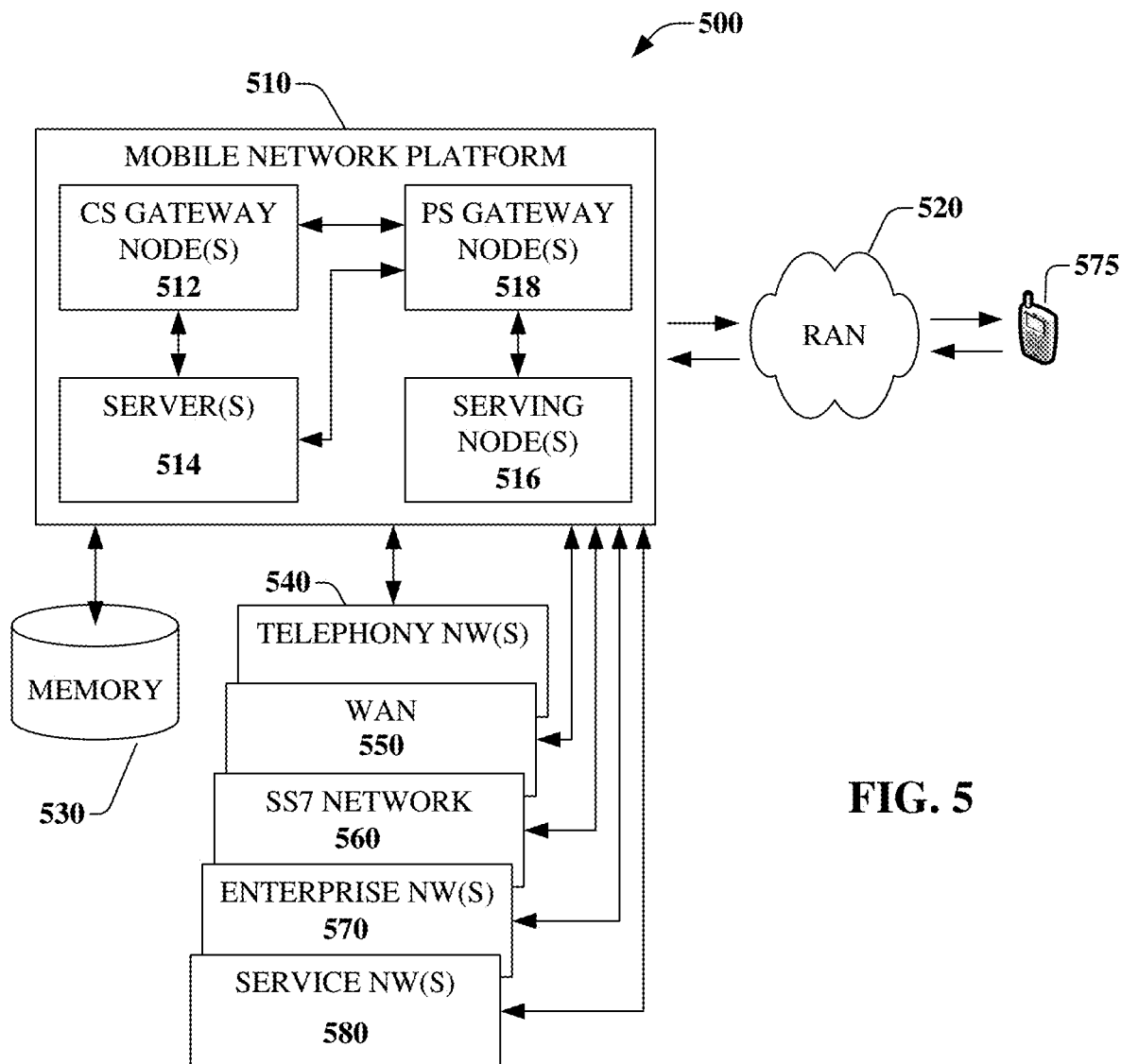
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part transmitting a first token that includes an identification of a date and a time when the first token is transmitted and a location from where the first token is transmitted, storing a copy of the first token in a database, receiving a content item and a second token from a user device, and applying a score to the content item based on a comparison of the copy of the first token and the second token. Platform 510 can facilitate in whole or in part recording a content item, receiving a first token that includes an identification of a date and a time when a first portion of the content item is recorded, and a location where the first portion of the content item is recorded, and transmitting the content item and the first token to a database. Platform 510 can facilitate in whole or in part obtaining a content item, receiving a first token that includes an identification of a date and a time when a first portion of the content item is obtain, a location where the first portion of the content item is obtained, or a combination thereof, and transmitting the content item and the first token to a database. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
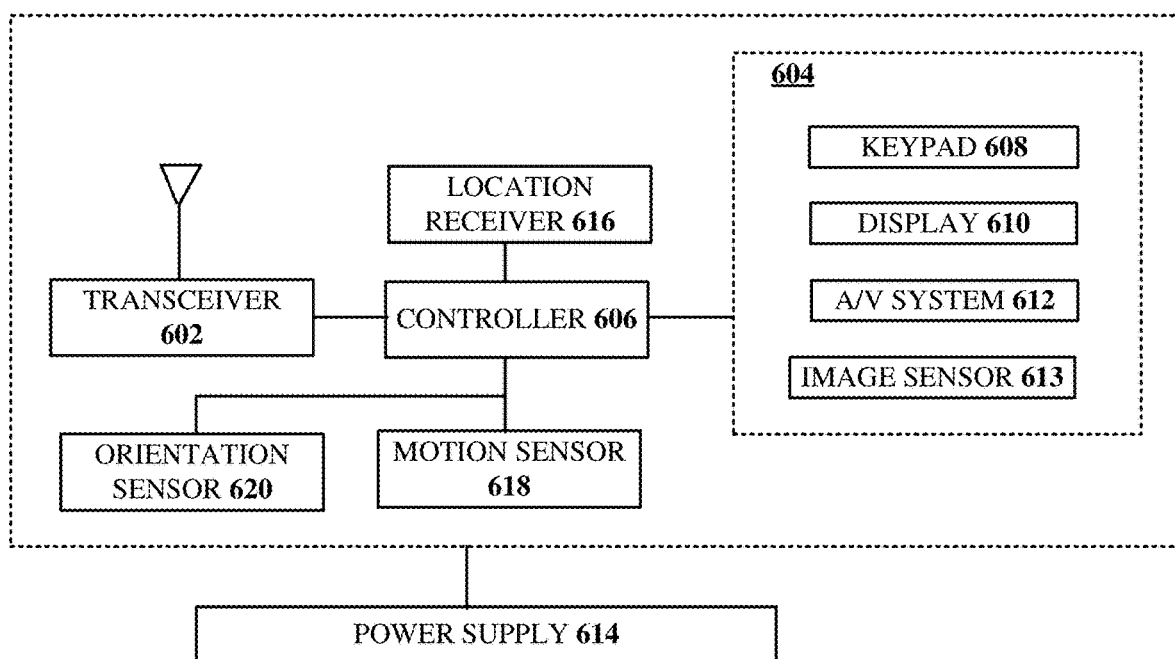
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part transmitting a first token that includes an identification of a date and a time when the first token is transmitted and a location from where the first token is transmitted, storing a copy of the first token in a database, receiving a content item and a second token from a user device, and applying a score to the content item based on a comparison of the copy of the first token and the second token. Computing device 600 can facilitate in whole or in part recording a content item, receiving a first token that includes an identification of a date and a time when a first portion of the content item is recorded and a location where the first portion of the content item is recorded, and transmitting the content item and the first token to a database. Computing device 600 can facilitate in whole or in part obtaining a content item, receiving a first token that includes an identification of a date and a time when a first portion of the content item is obtain, a location where the first portion of the content item is obtained, or a combination thereof, and transmitting the content item and the first token to a database.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A base station device, comprising:
a processing system including a processor; and
a memory that stores executable instructions that, when executed by the processing system, facilitate performance of operations, the operations comprising:
transmitting a first token that comprises an identification of a date and a time when the first token is transmitted and a location from where the first token is transmitted;
storing a copy of the first token in a database;
receiving a content item and a second token from a user device;
applying a score to the content item based on a comparison of the copy of the first token and the second token;
applying a facial recognition technique, a computed content fingerprint, or a combination thereof, to identify a person, an object, a scene, a location, an event, a landmark, or a combination thereof, captured in the content item;
transmitting a request to a second user device based on the applying of the facial recognition technique, the computed content fingerprint, or the combination thereof; and
responsive to transmitting the request, receiving from the second user device an indication as to whether the person, the object, the scene, the location, the event, the landmark, or the combination thereof, is captured in the content item, wherein the indication includes a hashed token that matches the second token, and wherein the applying of the score to the content item is further based on the indication.

2. The base station device of claim 1, wherein the database comprises a distributed ledger, wherein the distributed ledger comprises a plurality of devices, and wherein the storing of the copy of the first token in the database comprises storing a copy of the first token in the plurality of devices.

3. The base station device of claim 1, wherein the operations further comprise: applying encoding, hashing, or a combination thereof, to the copy of the first token resulting in a third token; and transmitting the third token to the user device, wherein the second token is based on the third token.

4. The base station device claim 1, wherein the operations further comprise: storing the content item in the database when the score is equal to or greater than a threshold; and discarding the content item when the score is less than the threshold.

5. The base station device of claim 1, wherein the operations further comprise: receiving a search request from a third user device; responsive to receiving the search request, selecting the content item based on the score exceeding a threshold; and transmitting an identification of the content item to the third user device responsive to selecting the content item.

6. The base station device of claim 5, wherein the identification of the content item comprises a selectable link associated with the content item, and wherein the transmitting of the identification of the content item to the third user device comprises transmitting the score to the third user device.

7. The base station device of claim 1, wherein the content item comprises a tag that identifies the person, the object, the scene, the location, the event, the landmark, or the combination thereof, captured in the content item, and wherein the transmitting of the request to the second user device is further based on the tag.

8. The base station device of claim 1, wherein the operations further comprise: receiving a second content item and a third token from a third user device, wherein the applying of the score to the content item is further based on a comparison of the second token and the third token.

9. A non-transitory, machine-readable medium, comprising executable instructions that, when executed by a processing system including a processor, facilitate performance of operations, wherein the non-transitory, machine-readable medium and the processing system are included within a base station, the operations comprising:
transmitting a first token that comprises an identification of a date and a time when the first token is transmitted, a location from where the first token is transmitted, or a combination thereof;
storing a copy of the first token in a database;
receiving a content item and a second token from a communication device;
applying a score to the content item based on a comparison of the copy of the first token and the second token;
applying a facial recognition technique, a computed content fingerprint, or a combination thereof, to identify a person, an object, a scene, a location, an event, a landmark, or a combination thereof, captured in the content item;
transmitting a request to a second communication device based on the applying of the facial recognition technique, the computed content fingerprint, or the combination thereof; and
responsive to transmitting the request, receiving from the second communication device an indication as to whether the person, the object, the scene, the location, the event, the landmark, or the combination thereof, is captured in the content item, wherein the indication includes a hashed token that matches the second token, and wherein the applying of the score to the content item is further based on the indication.

10. The non-transitory, machine-readable medium of claim 9, wherein the database comprises a distributed ledger, wherein the distributed ledger comprises a plurality of devices, and wherein the storing of the copy of the first token in the database comprises storing a copy of the first token in the plurality of devices.

11. The non-transitory, machine-readable medium of claim 9, wherein the operations further comprise:
applying encoding, hashing, or a combination thereof, to the copy of the first token resulting in a third token; and transmitting the third token to the communication device, wherein the second token is based on the third token.

12. The non-transitory, machine-readable medium of claim 9, wherein the operations further comprise:
determining that the score is greater than a threshold; and storing the content item in the database based on the determining that the score is greater than the threshold.

13. The non-transitory, machine-readable medium of claim 9, wherein the operations further comprise:
receiving a search request from a user device;
responsive to the receiving of the search request, selecting the content item based on the score exceeding a threshold; and
transmitting an identification of the content item to the user device responsive to the selecting of the content item.

14. The non-transitory, machine-readable medium of claim 13, wherein the identification of the content item comprises a selectable link associated with the content item, and wherein the transmitting of the identification of the content item to the user device comprises transmitting the score to the user device.

15. The non-transitory, machine-readable medium of claim 9, wherein the operations further comprise:
receiving a second content item and a third token from a user device,
wherein the applying of the score to the content item is further based on a comparison of the second token and the third token.

16. A method comprising:
transmitting, by a processing system including a processor, a first token that comprises an identification of a date and a time when the first token is transmitted, a location from where the first token is transmitted, or a combination thereof, wherein the processing system is included within a base station;
storing, by the processing system, a copy of the first token in a data storage;
obtaining, by the processing system, a content item and a second token from a user device;
applying, by the processing system, a score to the content item based on a comparison of the copy of the first token and the second token;
applying, by the processing system, a facial recognition technique, a computed content fingerprint, or a combination thereof, to identify a person, an object, a scene, a location, an event, a landmark, or a combination thereof, captured in the content item;
transmitting, by the processing system, a request to a second user device based on the applying of the facial recognition technique, the computed content fingerprint, or the combination thereof; and
responsive to transmitting the request, receiving, by the processing system and from the second user device, an indication as to whether the person, the object, the scene, the location, the event, the landmark, or the combination thereof, is captured in the content item, wherein the indication includes a hashed token that matches the second token, and wherein the applying of the score to the content item is further based on the indication.

17. The method of claim 16, wherein the obtaining of the content item comprises: recording, by the processing system, a first portion of the content item; and receiving, by the processing system, a second portion of the content item from a third user device.

18. The method of claim 17, wherein the content item comprises a panoramic video, and wherein the second portion of the content item is recorded by the third user device, the method further comprising: appending, by the processing system, an identification of the third user device to the second portion of the content item received from the third user device.

19. The method of claim 18, further comprising: transmitting, by the processing system, the content item to the data storage, wherein the transmitting of the content item comprises transmitting the identification of the third user device appended to the second portion of the content item.

20. The base station device of claim 5, wherein the selecting of the content item is further based on a preference of a user of the third user device, a capability of the third user device, a first location corresponding to a current location of the third user device, and a second location corresponding to a scheduled location of the third user device, the second location of the third user device being different from the first location of the third user device.

* * * * *